UNITED STATES PATENT OFFICE 2,648,689

PREPARATION OF p'(BENZOYLSULFAMYL) PHTHALANILIC ACID

Ferdinand B. Zienty, Brentwood, Mo., assignor to Monsanto Chemical Company, St. Louis, Mo., a corporation of Delaware No Drawing. Application November 6, 1950, Serial No. 194,380

3 Claims. (Cl. 260—397.7)

This invention relates to p'-(benzoylsulfamyl)-phthalanilic acid and its salts. p'-(Benzoylsulfamyl)phthalanilic acid may be represented by the following structural formula

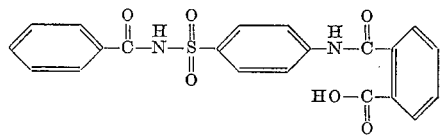

p'-(Benzoylsulfamyl)phthalanilic acid and its salts have been found to possess exceptional utility as therapeutic agents. p'-(Benzoylsulfamyl)phthalanilic acid is particularly effective in the treatment of cholera and bacillary dysentery.

p'-(Benzoylsulfamyl) phthalanilic acid may be conveniently prepared by reacting $N^1$-benzoyl-sulfanilamide and phthalic anhydride. The salts of p'-(benzoylsulfamyl)-phthalanilic acid may be prepared by reacting p'-benzoylsulfamyl)phthalanilic acid with an alkaline derivative of the desired salt forming element. The following examples are illustrative of the novel compounds of this invention:

Example I 43.2 g. of $N^1$-benzoyl-sulfanilamide, 27.8 g. of phthalic anhydride and 300 ml. of acetone are placed in a suitable reaction vessel and refluxed for approximately three hours. After the reaction is complete, p'-(benzoylsulfamyl)phthalanilic acid is separated therefrom by filtration, washed with water and dried by heating to a temperature of 85–90° C. for a period of about twelve hours. The substantially pure white crystalline p'-(benzoylsulfamyl)phthalanilic acid thus obtained has a melting point of 225°–230° C. with decomposition.

Example II 42.4 g. of p'-(benzoylsulfamyl)phthalanilic acid are mixed with 160.0 g. of a 5% aqueous sodium hydroxide solution and the reaction mixture evaporated to dryness, recovering the substantially pure disodium salt of p'-(benzoylsulfamyl)phthalanilic acid.

Example III 42.4 g. of p'-(benzoylsulfamyl)phthalanilic acid are mixed with 80.0 g. of a 5% sodium hydroxide solution and the reaction mixture evaporated to dryness, recovering the substantially pure monosodium salt of p'-(benzoylsulfamyl)-phthalanilic acid.

Example IV 84.8 g. of p'-(benzoylsulfamyl)phthalanilic acid are mixed with 741 g. of a 1% calcium hydroxide solution and the solution evaporated to dryness, recovering the substantially pure calcium salt of p'-(benzoylsulfamyl)phthalanilic acid.

The process as set forth in the preceding examples is subject to substantial variation as will be evident to those skilled in the art. In preparing p'-(benzoylsulfamyl)phthalanilic acid it is preferred that at least a one molecular proportion of phthalic anhydride be utilized for each one molecular proportion of $N^1$-benzoyl-sulfanilamide. From about 1.0 to about 1.5 molecular proportions of phthalic anhydride for each one molecular proportion of $N^1$-benzoyl-sulfanilamide has been found to be particularly advantageous.

The reaction between the $N^1$-benzoyl-sulfanilamide and phthalic anhydride may be carried out by any convenient method. Preferably, it is carried out in the presence of an inert organic liquid solvent or medium, such as acetone, toluene, benzene, etc. The reaction may also be carried out over a wide temperature range, such as in the range of from about 0° C. to about 200° C. Preferably, the reaction is carried out in the presence of an inert organic solvent by boiling the reaction mixture under reflux conditions.

After the reaction is complete, p'-(benzoylsulfamyl)phthalanilic acid may be recovered from the reaction mixture by filtration. If desired, p'-(benzoylsulfamyl)phthalanilic acid may be further purified by recrystallization from suitable solvents, such as ethanol.

The salts of p'-(benzoylsulfamyl)phthalanilic acid may be prepared by reacting p'-(benzoylsulfamyl)phthalanilic acid with an aqueous solution of an alkaline derivative of the desired salt forming element, such as the carbonate or hydroxide, and then evaporating the reaction mixture to dryness. Either the mono or di salts of p'-(benzoylsulfamyl)phthalanilic acid may be prepared. Typical of the various salts of p'-(benzoylsulfamyl)phthalanilic acid which are within the scope of this invention are the alkali metal salts, such as sodium, potassium, lithium, the alkaline earth metal salts, such as magnesium, calcium, etc., the salts of other metals, such as copper, iron and silver, the ammonium salts, and the substituted ammonium organic salts, such as the salts of methylamine, triethylamine, diethylamine, monoethanolamine, triethanolamine and isopropanolamine.

What is claimed is:

1. In a process for the preparation of p'(benzoyl-sulfamyl)phthalanilic acid, the step comprising reacting $N^1$-benzoyl-sulfanilamide and phthalic anhydride in acetone.

2. In a process for the preparation of p'(benzoyl-sulfamyl)phthalanilic acid, the step comprising reacting a one molecular proportion of $N^1$-benzoyl-sulfanilamide and at least a one molecular proportion of phthalic anhydride in acetone.

3. In a process for the preparation of p-(benzoyl-sulfamyl)phthalanilic acid, the step comprising reacting a one molecular proportion of $N^1$-benzoyl-sulfanilamide and at least a one molecular proportion of phthalic anhydride in acetone while boiling the reaction mixture under reflux conditions.

FERDINAND B. ZIENTY.

References Cited in the file of this patent

FOREIGN PATENTS

| Number | Country | Date |
| --- | --- | --- |
| 557,985 | Great Britain | Dec. 14, 1943 |
| 595,018 | Great Britain | Nov. 25, 1947 |

OTHER REFERENCES

Basu et al., "J. Ind. Chem. Soc.," vol. 27, August 1950, pp. 397 and 398.

Sikdar et al., "J. Indian Chem. Soc.," vol. 22, 1945, pp. 343, 344 and 345.